July 7, 1953 G. C. SZIKLAI 2,644,854

COLOR TELEVISION RECEIVER

Filed Dec. 1, 1948

INVENTOR
George C. Sziklai
BY
Olin J. Mitchell
ATTORNEY

Patented July 7, 1953

2,644,854

UNITED STATES PATENT OFFICE 2,644,854

COLOR TELEVISION RECEIVER

George C. Sziklai, Princeton, N. J., assignor to Radio Corporation of America, a corporation of Delaware Application December 1, 1948, Serial No. 62,886

7 Claims. (Cl. 178—5.4)

This invention relates to colored image viewing devices and more specifically to color television image reproducing systems and still more particularly to those systems employing fine structure fluorescent screens composed of elemental areas which emit light of different color.

It is generally well known in the television art that an intelligence consisting of an image in full color may be dissected into a plurality of simultaneously transmitted images, each corresponding to a single component primary color. For the usual tricolor additive system the component colors are three in number and are usually red, green, and blue.

There are also well known methods of suitably recombining the separate color images in a television receiver to produce a full color image, which include various systems employing a plurality of kinescopes and optical means for superimposing the reproduced images in substantially perfect registry.

Another well known method of reconstructing a full color image from its associated primary color images involves the action of one or more electron beams which simultaneously or sequentially scan a multi-element fluorescent screen comprising areas of different color emitting phosphors of sufficiently fine texture that the colors blend in the observer's eye. Such a system is described in my Patent No. 2,634,327, dated April 7, 1953.

The quality of color reproduction attainable with fine structure phosphor screens of this type is limited because the presently available color phosphors, especially the red, and blue, have very low chromatic saturation. Such low saturation colors can be considered to be pure spectral colors diluted with white light.

Proposals have been made for a solution of this difficulty which involve placing a colored filter directly adjacent to each color phosphor element, the color of each filter corresponding to that of its respective phosphor. In order to avoid parallax effects when viewing such an arrangement it is necessary to include the filters within the kinescope envelope. This results in exposure of the filters to an evacuating process which causes gelatin or plastic filter materials to decompose. Dichroic one-quarter wave length dielectric interference filters might be used for this purpose but at the present state of the art the colors so produced would again be of low saturation.

According to this invention a means is provided for increasing the chroma of colored images having low saturation by viewing said images through a special filter having a plurality of peaks in the visible portion of its spectro-photometric response characteristic. One form of this invention being a filter composed of a multiplicity of sets of elemental filter areas whose minor dimensions are smaller than the resolving power of the observer's eye.

A primary object of this invention is to provide a color television image having improved color values.

Another object of this invention is to provide a viewing means which improves the chroma of substantially all observed color images, for example, colored motion pictures or colored printed matter.

Still another object of this invention is to provide for simultaneous color image reproduction which is free from registration difficulties.

Other and incidental objects of the invention will be apparent to those skilled in the art from a reading of the following specification and an inspection of the accompanying drawing in which.

Figures 1, 2, 3, 4, 5, 6:
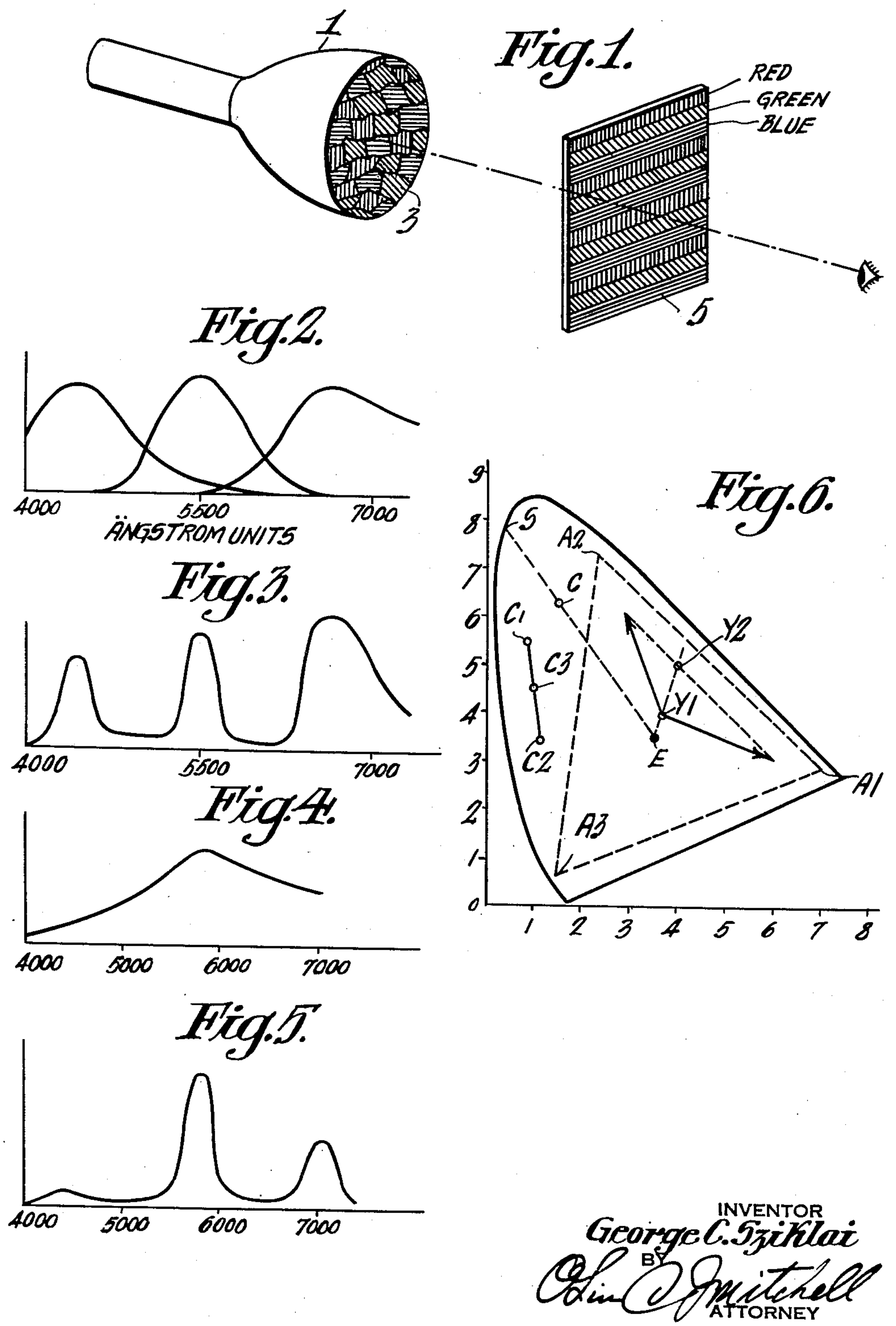
Figure 1 shows one form of this invention relating to color television image reproduction.
Figure 2 shows superimposed spectral transmission curves for three typical Wratten type filters of predominately red, green, and blue colors respectively.
Figure 3 shows a typical spectro-photometric response characteristic for a composite filter as embodied in one form of this invention.
Figure 4 shows the spectral distribution curve for a yellow-orange color of low saturation.

Figure 5 shows the spectral distribution curve of the low saturation yellow-orange color of Figure 4 when viewed through the filter whose characteristic is represented by Figure 3; and, Figure 6 shows a C. I. E. chromaticity diagram, an explanation of which may be found in the "Handbook of Colorimetry" prepared by the staff of the Color Measurement Laboratory, M. I. T., published by the Technology Press, Cambridge, Mass.

Turning now in detail to Figure 1 a kinescope 1 having a multicolor phosphor screen 3 is employed by way of example as a color image having low saturation. A typical example of the production of a colored image by means of a multicolored phosphor screen is described in my Patent No. 2,543,477 dated February 27, 1951, wherein a fluorescent screen composed of small areas of different color emitting phosphor backed by an electron retarding material is caused to produce a colored image by utilizing the fact that the maximum light output of a phosphor occurs at a particular electron velocity. The retarding material is distributed over the colored phosphor areas with a varying depth sufficient to retard the electron velocity to the value required for maximum excitation of the phosphor of its corresponding color. When the electron beam is velocity modulated in accordance with the particular component color being transmitted, a full color image is produced on the screen. The colored image is viewed through special filter 5 which is shown in Figure 1 to be composed of very narrow strips of red, green, and blue colored filters alternately arranged. The filter strips are of sufficiently fine texture that the eye of the observer cannot resolve the separate colors. Although the filter 5 is shown to be composed of strips, this construction is merely dictated by mechanical ease of fabrication and many other sizes, shapes, and arrangements of elemental areas are equally feasible, including irregularly shaped areas and constructions wherein the entire filter is substantially homogeneous.

Light from the image passes through the filter where each filter element strip selectively saturates the chroma of the associated color component of the image, light of a color different from that of a specific filter element being substantially eliminated. The resultant viewed image therefore appears to have increased color gamut.

A more detailed explanation of the necessity for such a chroma improvement and the operation of this invention can best be understood by reference now to Figure 2.

Since a color can be matched by a suitable mixture of three stimuli, such as red, green and blue, a system of color measurement can be built up in which any color is represented by three numbers specifying the relative amounts of the three stimuli required to match it.

By the system adopted in 1931 by the Commission Internationale de l'Eclairage and fully described in the "Handbook of Colorimetry" prepared by the staff of the Color Measurement Laboratory, Massachusetts Institute of Technology, Cambridge, Massachusetts, any color can be specified in terms of three coordinates, X, Y and Z, which is illustrated graphically in the explanation of this invention by the color triangle, which is also referred to as the C. I. E. system.

The position of the color only indicates the relative amounts of the three stimuli; brightness is regarded as a separate attribute and specified separately.

In Figure 6 the mixture of two colors $C_1$ and $C_2$ produces a new color, $C_3$, lying on the straight line joining $C_1$ and $C_2$ and at the "center of gravity" between them where the "weights" of $C_1$ and $C_2$ correspond to the number of units of each color in the mixture. Since the locus of the spectrum colors in the color triangle is everywhere found to be convex, all the colors produced by physical radiations must lie inside the spectrum locus. The centroid of the triangle E is the color of the equal energy spectrum. Any color C may be regarded as a mixture of white and a monochromatic radiation. The dominant hue is found by drawing a straight line from the white point through C to intersect the spectrum locus at S. While the distance of C along the line indicates the saturation of the color, to determine the color of a radiation with some known energy distribution, the colors of each of the monochromatic components must be added together on the "center of gravity" principle.

In Figure 6 there is shown the possible range of colors that would be reproduced by the additive color process, using $A_1$, $A_2$ and $A_3$ as reproduction primaries.

According to the popular additive process, an assumed set of reproduction primaries $A_1$, $A_2$ and $A_3$ are shown plotted in the color triangle. Any color reproduced by this process will be an additive mixture of $A_1$, $A_2$ and $A_3$ and must therefore lie inside the triangle formed by these three points. The choice of the primaries should be such that this area is as large as possible, provided the red, and the blue primaries are not too dark and the line $A_1$, $A_2$ does not lie too far from the spectrum locus. Saturated yellows are common in nature and should be accurately reproduced; blue-greens are rare, and of less importance. The choice of the primaries must also, of course, depend on the dyes that are available and on other practical considerations.

The color transmission response curves of three typical Wratten type filters of red, green, and blue color are shown in Figure 2. These filters are typified by the commercially available Wratten filters No. 29F, 61N, and 47 although it is not intended that they should correspond to any particular commercial dyes or filters.

The composite spectro-photometric response characteristic of the combination of these three filters in laminated form is shown in Figure 3. It is seen to have a substantially sharp peak in each of three selected regions in the red, green, and blue portions of the visible spectrum.

The action of the composite filter can best be described by examination of the following example.

The spectral distribution curve of a low saturation yellow-orange color is depicted in Figure 4. It is apparent that although the maximum intensity of radiation occurs at a yellow-orange wave length (approximately 5900 A°), there are many other wave lengths present of almost equal intensity.

When the yellow-orange color of Figure 4 is viewed through the filter whose composite spectral transmission characteristic is shown in Figure 3, the result is an effective ordinal multiplication of the two curves producing the new spectral distribution curve shown in Figure 5.

The resultant curve of Figure 5 shows a relative amplification and sharpening of the spectral components closely adjacent to and including the 5900 A° maximum and a relative attenuation of spectral components outside of this region. The observer appreciates this resultant spectral distribution as an apparent increase in chromatic intensity in the yellow-orange direction.

Referring now to Figure 6, the yellow-orange color is again depicted as a point $y_1$ on the chromaticity diagram. Its position near the point E representing white light indicates the lack of saturation of the color. Points $A_1$, $A_2$, and $A_3$ represent the positions of the three filter reduction primaries, which in this diagram are Wratten filters numbered 29F, 61N, and 47 for $A_1$, $A_2$, and $A_3$ respectively. These are intended merely to represent typical selections since any other set of primaries lying near the vertices of the chromaticity diagram may be used. The arrow directed from point $y_1$ toward $A_2$ represents the magnitude of the increase in green saturation produced by means of this invention. The arrow directed from point $y_1$ toward $A_1$ represents the magnitude of the increase in red saturation produced by this invention. According to the center of gravity method of adding component colors on the diagram, the resultant color must lie on a line connecting the points of the two arrows at a position represented by point $y_2$. Clearly there has been effected a substantial increase in saturation of the original yellow-orange color.

Although the operation of the invention has been described in terms of the improvement of a specific low saturation yellow-orange, it is obvious that improvement in saturation can be effected upon any color lying within the triangle subtended by the three selected primaries $A_1$, $A_2$, and $A_3$. By suitable selection of the positions of $A_1$, $A_2$, and $A_3$ it is also possible to exclude certain ranges of colors from the improvement process. For example, the high saturation blue-greens which are uncommon in nature are not improved by the selection of primaries shown in Figure 6.

Although this invention has been described in connection with the image produced by a television kinescope it is not limited to such a use, but may be employed to advantage as a viewing or reproducing device for substantially any colored images having imperfect color values. Colored motion pictures and slides, colored printing and lithographing processes, and colored reproductions employing pigments, dyes or inks all have reduced color gamut and are therefore susceptible to color improvement when viewed or reproduced by means of this device.

Having thus described the invention, what is claimed is:

1. A colored image viewing device comprisng in combination a plurality of sets of light transmitting areas, each area of an individual set having a different frequency selective transmission characteristic and a kinescope employing a fine structure multicolor phosphorescent screen having a plurality of elemental areas of different color emitting phosphors, together with optical means for viewing said kinescope through said device, and wherein the elemental areas of said viewing device have different color light transmitting areas of smaller minor dimension than the resolving power of the unaided eye at normal viewing distance.

2. A colored image reproducing device comprising in combination a multiple element filter having a plurality of sets of light transmitting areas, each area of an individual set having a different frequency selective transmission characteristic and a kinescope having a plurality of elemental areas which produce light of different colors together with optical means for projecting the image produced by said kinescope through said device, and wherein the elemental areas of said image reproducing device have differently colored light transmitting areas of smaller minor dimension than the resolving power of the unaided eye at normal viewing distance.

3. A color television reproducing device comprising in combination a multiple component color image producing tube, a filter element having a plurality of peaks in the visible portion of its spectro-photometric response characteristic, and wherein said peaks correspond substantially to the component colors of said component color image producing tube.

4. A color television reproducing device comprising in combination a multiple component color image producing tube, and a filter element having a plurality of peaks in the visible portion of its spectro-photometric response characteristic.

5. A composite color image producing device comprising in combination, a source of different selected and distinct component color images, a filter element having a characteristic curve indicating a peak of light transmission at different distinct colors.

6. A colored image viewing device comprising in combination means for producing a colored image whose component colors are of imperfect chromatic saturation, a filter having a plurality of peaks in the visible portion of its spectrophotometric response characteristic and optical means for viewing through said filter said colored image whose component colors are of imperfect chromatic saturation.

7. A colored image reproducing device comprising in combination means for producing a colored image whose component colors are of imperfect chromatic saturation, a filter having a plurality of peaks in the visible portion of its spectrophotometric response characteristic and optical means for projecting through said filter said colored image whose component colors are of imperfect chromatic saturation.

GEORGE C. SZIKLAI.

References Cited in the file of this patent

UNITED STATES PATENTS

| Number | Name | Date |
|---|---|---|
| 1,081,484 | Brasseur | Dec. 16, 1913 |
| 2,154,109 | Parks | Apr. 11, 1939 |
| 2,296,908 | Crosby | Sept. 29, 1942 |
| 2,389,979 | Huffnagle | Nov. 27, 1945 |
| 2,416,301 | Goldmark | Feb. 25, 1947 |
| 2,492,926 | Valensi | Dec. 27, 1949 |
| 2,512,123 | Weimer | June 20, 1950 |